(12) United States Patent
Smith et al.

(10) Patent No.: US 6,407,874 B1
(45) Date of Patent: Jun. 18, 2002

(54) METHOD AND APPARATUS FOR DETECTION SLIDER AIRBEARING RESONANCE USING SAT P-LIST DATA

(75) Inventors: Gordon James Smith; Hal Hjalmar Ottesen, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,047

(22) Filed: Mar. 30, 2000

(51) Int. Cl.[7] .............................................. G11B 5/02
(52) U.S. Cl. ..................................... 360/25; 324/212
(58) Field of Search ............................. 360/25, 31, 75; 324/212

(56) References Cited

U.S. PATENT DOCUMENTS 5,917,724 A * 6/1999 Brousseau et al. ............ 360/48
6,104,188 A * 8/2000 Coker et al. .................. 360/25

* cited by examiner

Primary Examiner—Regina Y. Neal
(74) Attorney, Agent, or Firm—Joan Pennington

(57) ABSTRACT

A method and apparatus are provided for detection of the presence of slider airbearing resonance using surface analysis test (SAT) primary defect list (P-list) data. The P-list in the disk drive is selected. Checking for a cluster threshold of adjacent tracks within a sector to identify a SAT cluster is performed. Responsive to identifying the SAT cluster, checking for multiple defects on some tracks within the SAT cluster is performed. Responsive to identifying multiple defects on some tracks within the SAT cluster, the SAT cluster is converted to a binary matrix map. A histogram is generated for the binary matrix map. The harmonic magnitude content of the histogram from harmonics centered about a predetermined slider airbearing resonance frequency is identified. A harmonic power ratio (HPR) for the SAT cluster is computed and compared with a harmonic power ratio threshold Responsive to the computed HPR being greater than the harmonic power ratio threshold, a wavefront frequency of the SAT cluster is computed.

16 Claims, 12 Drawing Sheets

METHOD AND APPARATUS FOR DETECTION SLIDER AIRBEARING RESONANCE USING SAT P-LIST DATA

FIELD OF THE INVENTION

The present invention relates generally to the data processing field, and more particularly, relates to a method and apparatus for detection of the presence of slider airbearing resonance using surface analysis test (SAT) P-list data.

DESCRIPTION OF THE RELATED ART

Techniques for detecting disk surface defects are known. Most commercially available disk drives store a standard primary defect list (P-list) and a grown defect list (G-list) in a protected area of the disk drive, often referred to as disk defect logs. The P-list is generated for each disk file at manufacturing time and stores information of specific locations of magnetic surface defect sites and the alternate site for storing data. The G-list is generated and periodically updated while the disk drive is in use including stored information of grown defects that occurred after manufacturing.

Special manufacturing slider-glide-test procedures, such as Harmonic Ratio Flyheight (HRF) and Clearance Modulation Detection (CMD) typically are used to detect the presence of airbearing resonances in direct access storage device (DASD) sliders.

It is desirable to provide a method and apparatus for detection of slider airbearing resonance that eliminates the need for Special manufacturing slider-glide-test procedures, such as Harmonic Ratio Flyheight (HRF) and Clearance Modulation Detection (CMD). A need exists for an improved method and apparatus for detection of slider airbearing resonance.

SUMMARY OF THE INVENTION

A principal object of the present invention is to provide an improved method and apparatus for detection of the presence of slider airbearing resonance. Other important objects of the present invention are to provide such method and apparatus for detection of the presence of slider airbearing resonance substantially without negative effect and that overcome many of the disadvantages of prior art arrangements.

In brief, a method and apparatus are provided for detection of the presence of slider airbearing resonance using surface analysis test (SAT) P-list data. The P-list in the disk drive is selected. Checking for a cluster threshold of adjacent tracks within a sector to identify a SAT cluster is performed. Responsive to identifying the SAT cluster, checking for multiple defects on some tracks within the SAT cluster is performed. Responsive to identifying multiple defects on some tracks within the SAT cluster, the SAT cluster is converted to a binary matrix map. A histogram is generated for the binary matrix map. The harmonic magnitude content of the histogram from harmonics centered about a slider airbearing resonance frequency fa is identified.

In accordance with features of the invention, a harmonic power ratio (HPR) for the SAT cluster is computed and compared with a harmonic power ratio threshold. Responsive to the computed HPT being greater than the harmonic power ratio threshold, a wave-front frequency of the SAT cluster is computed. The wave-front frequency fw of said SAT cluster is represented by:

$$fa \sim fw = \frac{\sum_{k=k_1}^{k_2} A(k)f(k)}{\sum_{k=k_1}^{k_2} A(k)} \quad \text{Equation 1}$$

where $A(k)$ is the harmonic magnitude of the DFT at harmonic frequency $f(k)$ and $k$ is the harmonic frequency index and $k_1$ and $k_2$ are computed harmonic indices.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
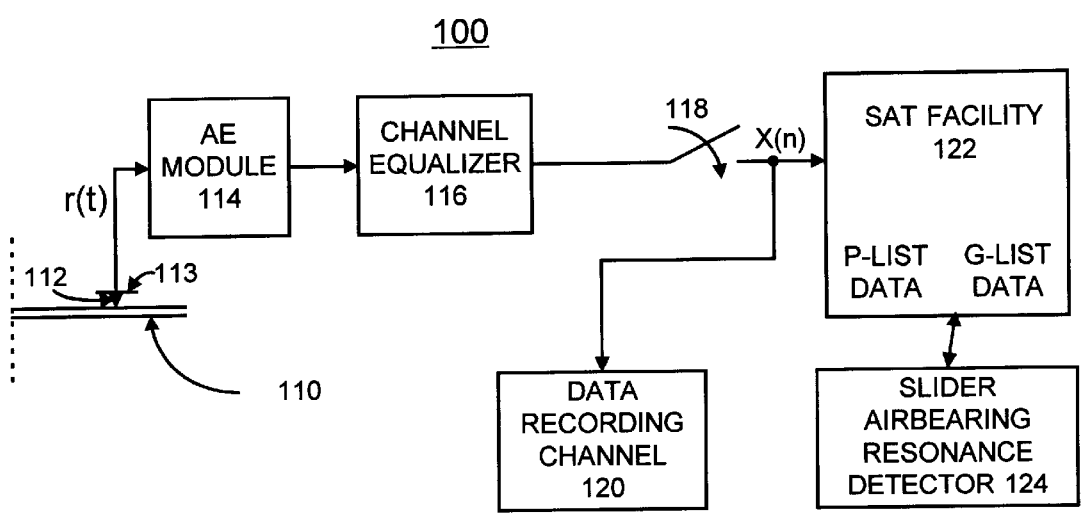
FIG. 1 is a block diagram representation illustrating a direct access storage device (DASD) for implementing methods for detection of slider airbearing resonance using surface analysis test (SAT) P-list data in accordance with the preferred embodiment.

Having reference now to the drawings, in FIG. 1, there is shown a direct access storage device (DASD) of the preferred embodiment generally designated by the reference character 100. As shown in FIG. 1, direct access storage device (DASD) 100 includes a recorded disk 110 that is spun at constant speed and a recording head 112 carried by a slider 113 that is positioned on a given track for reading information stored on that track. The readback signal r(t) is highpass-filtered by an arm electronic (AE) module 114, and its filtered output is bandpass-filtered through a channel equalizer 116. An equalized channel equalizer output X(t) is sampled by an analog-to-digital converter (A/D) 118 to provide a discrete-time digital sequence X(n). The digital sequence X(n) is then sent onto a data recording channel 120 and to a surface analysis test (SAT) facility 122. A slider airbearing resonance detector 124 can access P-list data and G-list data from the SAT facility 122.

Figure 3:
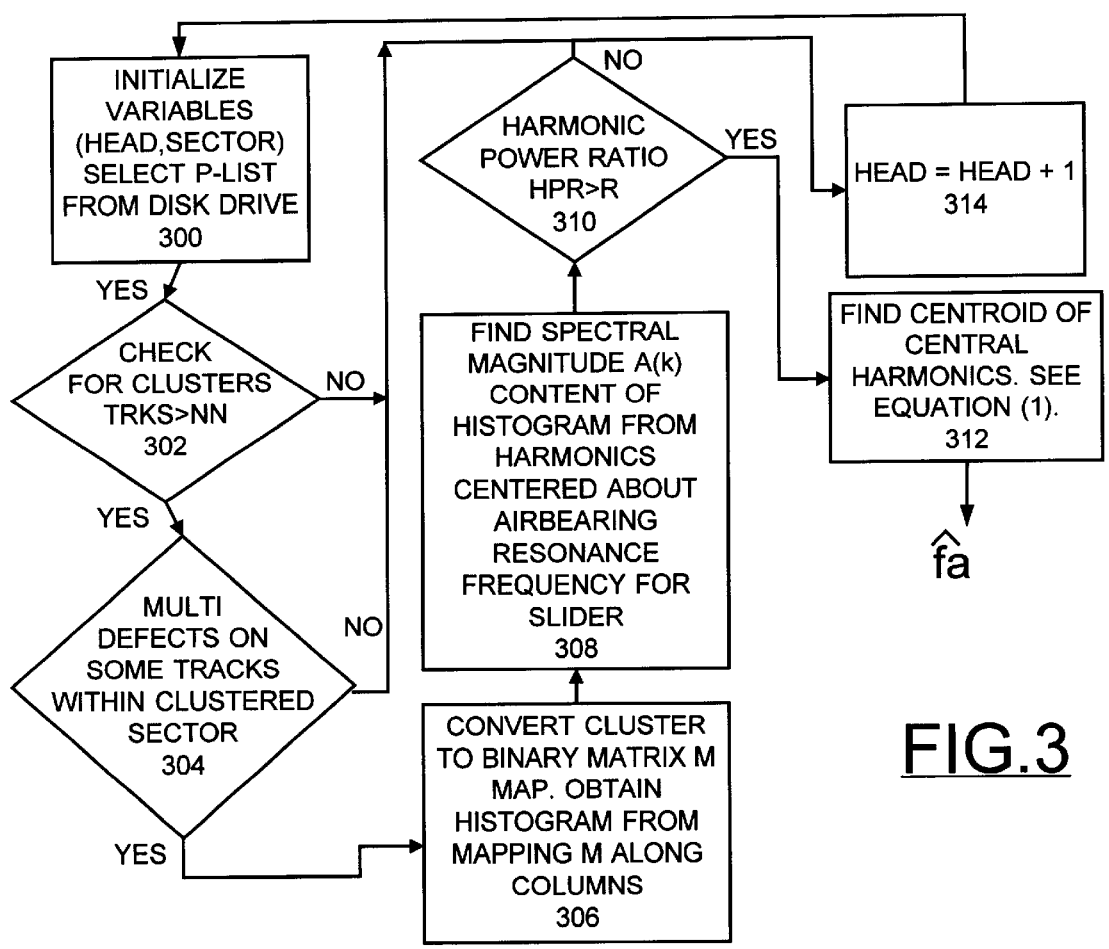
FIG. 3 is a flow chart illustrating exemplary sequential steps for detection of slider airbearing resonance using surface analysis test (SAT) P-list data in accordance with the preferred embodiment.

Slider airbearing resonance detector 124 is suitably programmed to execute the flow charts of FIG. 3 of the preferred embodiment.

In accordance with features of the invention, the detection of airbearing resonance in hard disk drive sliders is achieved by special processing of the P-list or G-list data. The presence of slider airbearing resonance is mainly synonymous to physical or near-physical head-to-disk contact by a protruding defect or asperity. The invention enables early identification of a protruding defect which is especially important, since it may avoid a potential disk crash and extend the useful life of the disk drive immensely. The commonly used glide tests, such as HRF and CMD are no longer needed. Thus, the cost of testing in manufacturing is reduced substantially. Disk drives that show airbearing resonance will not be shipped, but will be reworked. This will improve disk drive quality and reliability.

All hard disk drives undergo a surface analysis test (SAT), which essentially maps all error sites on the disk surface by location including head, track and sector. These SAT sites are minute sites where data cannot be read back correctly. The location of these SAT sites are located or stored in a file called a P-list. During normal operation, new or grown SAT sites occur. These new SAT sites are stored in a G-list. All SAT sites are relocated as a complete track-sector-site to another track-sector-site where data can be written and read reliably. A typical section of a long P-list with multiple SAT sites on the same tracks is shown in Table 1 below.

TABLE 1 section of a P-list

| Head | track | sect1 | SID1 | sect2 | SID2 |
|---|---|---|---|---|---|
| 3 | 7415 | 79 | 527 | 79 | 538 |
| 3 | 7417 | 79 | 239 | 79 | 249 |
| 3 | 7418 | 79 | 200 | 79 | 261 |
| 3 | 7419 | 79 | 218 | 79 | 279 |
| 3 | 7419 | 79 | 513 | 79 | 553 |
| 3 | 7420 | 79 | 266 | 79 | 282 |
| 3 | 7420 | 79 | 519 | 79 | 537 |
| 3 | 7420 | 79 | 794 | 79 | 809 |
| 3 | 7421 | 79 | 244 | 79 | 276 |
| 3 | 7421 | 79 | 483 | 79 | 546 |
| 3 | 7421 | 79 | 747 | 79 | 808 |
| 3 | 7422 | 79 | 197 | 79 | 264 |

As shown in Table 1, the P-list has data organized in six columns. The first column, head is the head number, the second column, track is the track number, the third column, sect1 is start sector, the fourth column, SID1 is the beginning sector identification (SID) count, the firth column, sect2 is the end sector, and the sixth, SID2 is the end SID count. Each sector contains a fixed number of SID counts, for example, a sector may contain 3070 SID counts. Note in Table 1 that all SAT sites are located on surface head 3 and in sector 79. The first entry shows that track 7415 has a single SAT site starting at SID count 527 and ending at SID count 538. Track 7416 has no SAT site in sector 79. Track 7417 has a single SAT site starting at SID count 239 and ending at SID count 249. Track 7419 has a double SAT site, starting at SID count 218 and ending at SID count 279, and starting at SID count 513 and ending at SID count 553. If there are many SAT sites on adjacent tracks within the same sector on the same surface, then the SAT sites are combined into a SAT cluster. Various cluster algorithms are known for locating clusters within P-lists. A surface defect can either be a magnetic void, a pit, a bump, or a combination of these. A large bump is very often associated with an airbearing resonance, caused by a bouncing action of the slider 113 in the wake of the protruding bump. The larger the bump, the more bounce of the slider 113. Large surface bumps are notorious for causing physical head-to-disk contact, which is the precursor for a fatal disk crash. All users of hard disk drives dread even the thought of a fatal disk crash, since all data stored on that unfortunate disk drive may be lost forever.

Figure 2:
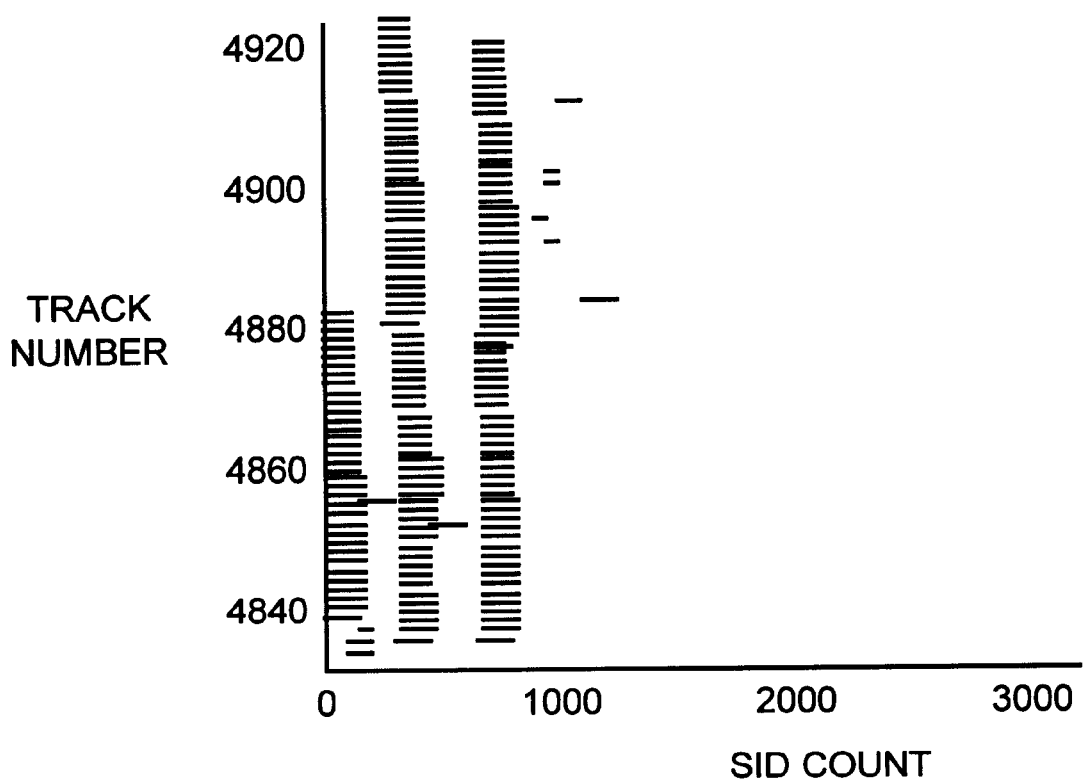
FIG. 2 is a chart illustrating P-list data with track number shown along the vertical axis and sector identification (SID) shown along the horizontal axis.
Figure 4A:
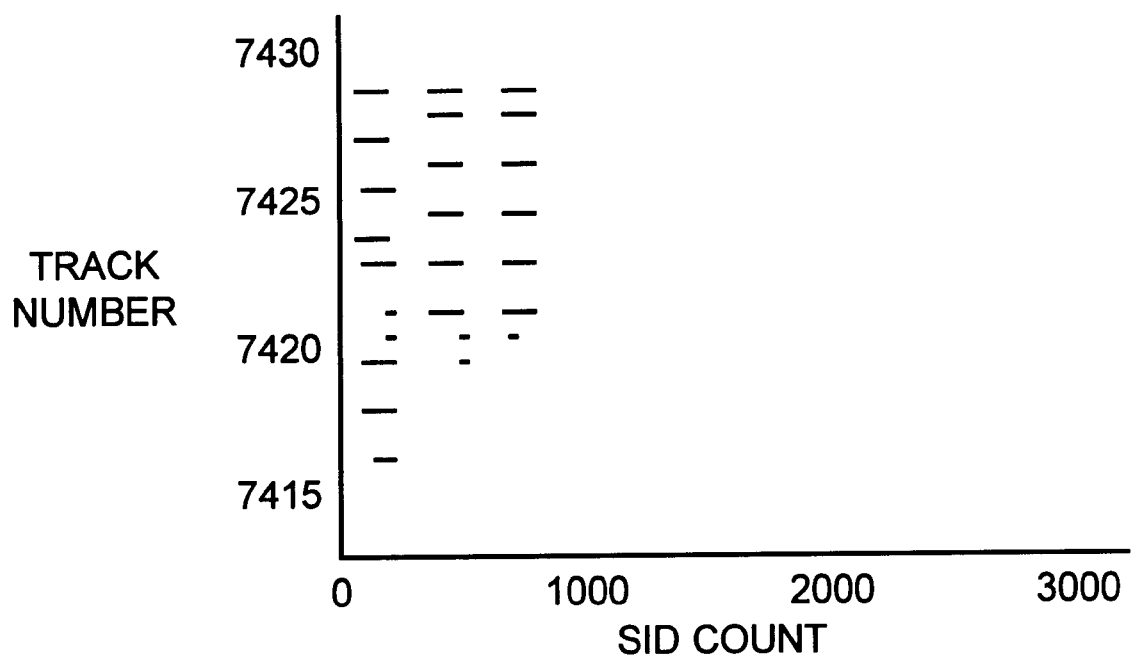
FIGS. 4A, 4B, 4C, 5A, 5B, 5C, 6A, 6B, and 6C are charts illustrating example P-list data in accordance with the preferred embodiment.
Figure 4B:
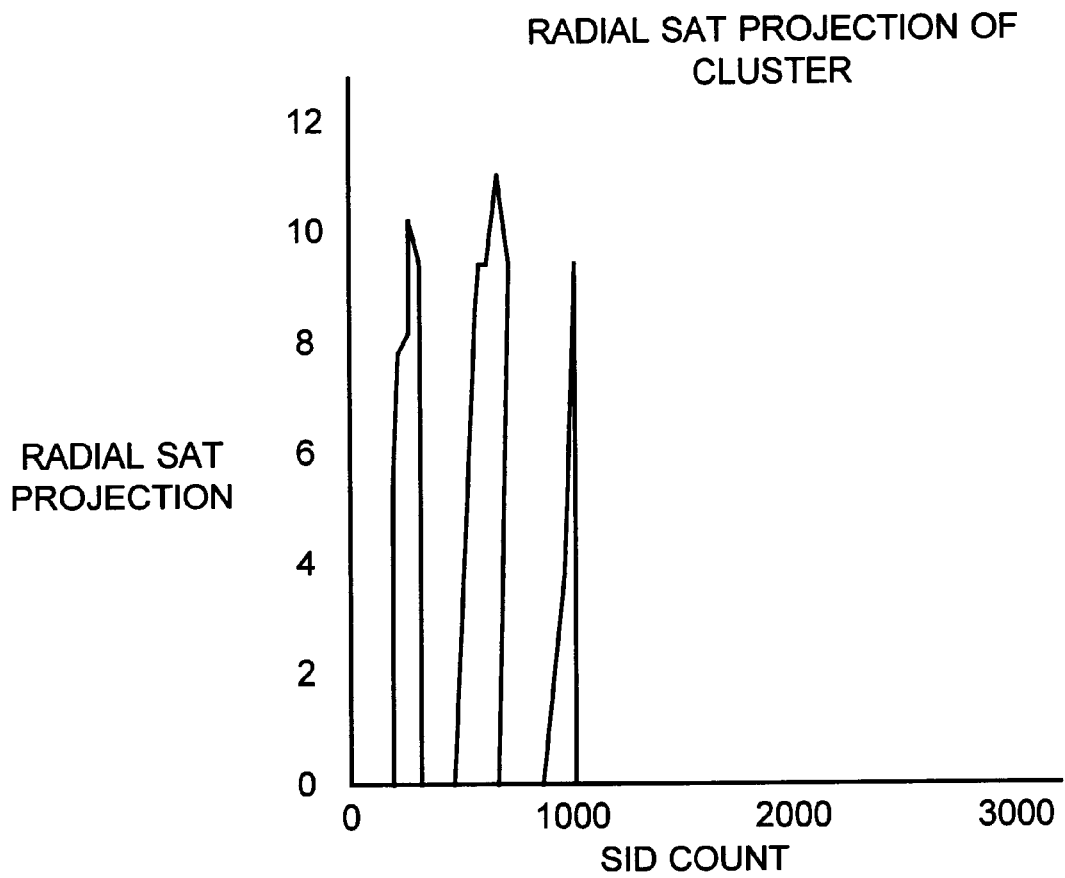
Figure 5A:
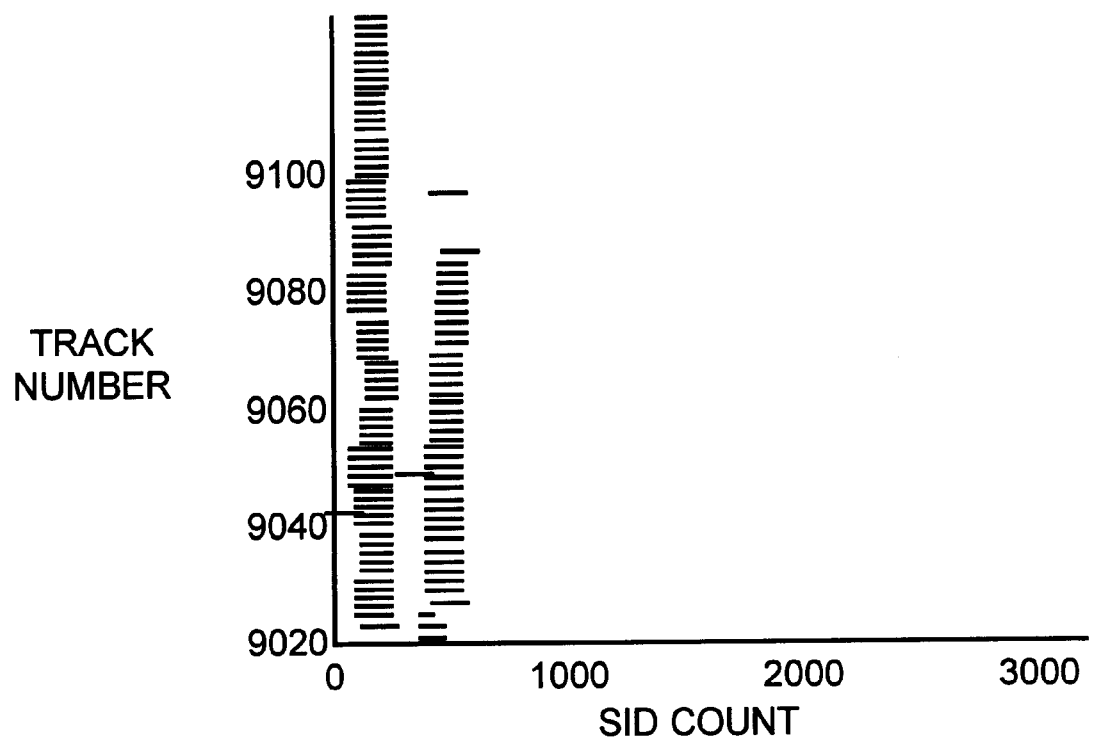
Figure 5B:
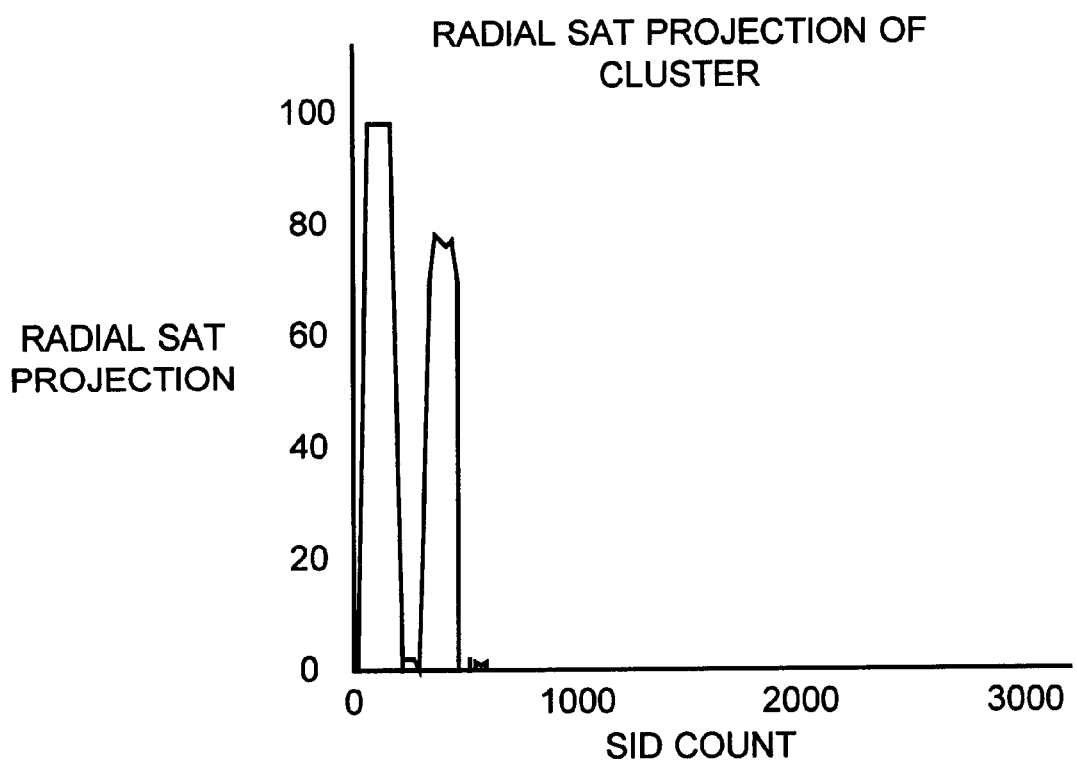

FIG. 2 illustrates an unexpected discovery of the nature of multiple SAT sites within SAT clusters as a result of an initial P-list analysis. Note that the within-the-cluster SAT sites look like wave-fronts. Similar illustrations of FIG. 2 are shown in FIGS. 3A, 4A, and 5A. The graph represented in FIG. 2 has a corresponding binary (only zeros and ones) matrix M mapping. This matrix has dimensions (N×3070), where N is the number of tracks in the cluster and 3070 is the maximum SID count within a sector. Note that the second dimension of the binary matrix M corresponds to the circumferential direction on the disk surface. A "1" in the matrix represents part of a SAT site. By radial projection or a summation along the individual columns in mapping matrix M, a cumulative defect histogram can be obtained. Such SAT histograms are shown in FIGS. 3B, 4B, and 5B.

Discrete Fourier transform (DFT) analysis is then applied to the circumferential, cumulative defect histogram to reveal the frequency content of the SAT site wave-fronts. Theoretical calculations verified by laboratory experiments can determine the airbearing resonance frequency $f_a$ of a particular slider to fall within a small percentage, such as 5–10%. A subset of the harmonic wave-front frequencies f(k) in the vicinity of $f_a$ is then extracted. A centroidal method of Equation 1 below, applied to the harmonic frequency subset can determine the main frequency $f_w$ in the wave-front. Comparison of the main wave-front frequency $f_w$ with the precomputed airbearing resonance frequency of the slider $f_a$ can determine when they are almost identical. The estimated airbearing resonance frequency of the slider $f_a$ can be approximately equal to the wave-front frequency $f_w$. The formula for computing the wave-front frequency $f_w$ is set forth in Equation 1 below.

$$fa \sim fw = \frac{\sum_{k=k_1}^{k_2} A(k) f(k)}{\sum_{k=k_1}^{k_2} A(k)} \quad \text{Equation 1}$$

where A(k) is the harmonic magnitude of the DFT at harmonic frequency f(k) and k is the harmonic frequency index. The harmonic indices $k_1$ and $k_2$ are computed as follows. Let the time between SID counts be $\Delta t$ and let the total number of SID counts within the data sector be Q, then the DFT frequency resolution $\Delta f$ is equal to:

$$\Delta f = 1/(Q\Delta t) \quad \text{Equation 2}$$

For a disk drive where Q=3070 and $\Delta t = 10.78 \times 10^{-9}$ seconds, this corresponds to a frequency resolution of $\Delta f = 16.47$ kHz. The harmonic indices $k_1$ and $k_2$ must be computed such that the inequalities in the following Equation 3 are satisfied.

$$k_1 \Delta f < f_a < k_2 \Delta f \quad \text{Equation 3}$$

FIG. 3 illustrates exemplary sequential steps for detection of slider airbearing resonance using surface analysis test (SAT) P-list data in accordance with the preferred embodiment. As indicated in a block 300, after initialization of variables, head and sector numbers, a P-list is selected from the disk drive. The head number is first set to zero and a cluster algorithm as indicated in a decision block 302 checks for clusters, checking for more than NN adjacent tracks within a given sector. The cluster threshold NN may typically be set to NN~0.5*Wpad/Wtrack, where Wpad is the width of the trailing slider-pad and Wtrack is the track width. For example, the cluster threshold NN~60 for a disk drive where Wpad=220 microns and Wtrack=1.86 micron. If no clusters are found, then the head number is indexed by one as indicated in a block 314 and the next surface is analyzed. If one or more clusters are found at block 302, then another algorithm is performed as indicated in a decision block 304 checking successively for multiple SAT sites on some tracks within the identified clusters. If none is found, the head number is indexed by one again at block 314. If multiple SAT sites have been identified within one or more clusters, then the corresponding P-lists are used to generate one or more binary matrices M of a dimension (N×P) as indicated in a block 306. Here N is the number of tracks in the identified cluster and P is the maximum SID count within the data sector, for example P=3070 in one known disk drive. In the binary mapping matrix M, a "1" implies a SAT defect and a "0" does not. A histogram is then obtained by summing all P columns of mapping matrix M at block 306. Next as indicated in a block 308, the histograms are successively transformed using a discrete Fourier transform (DFT) which computes only one harmonic DFT bin at a time. It is only necessary to compute a few harmonic magnitudes A(k) for corresponding frequencies straddling the airbearing resonance frequency. A typical number may be eight harmonics. This speeds up the process and makes in-situ operations possible. To validate the suitability of the P-list data in the cluster, a harmonic power ratio (HPR) is computed for the selected cluster as indicated in a decision block 310. This is achieved using the following Equation 4.

$$HPR = \frac{\sum_{k=k_1}^{k_2} A^2(k)}{\sum_{k=m_1}^{m_2} A^2(k)} > R \qquad \text{Equation 4}$$

where the sum in the denominator has twice as many harmonic terms as the numerator and the denominator must contain the harmonics in the numerator. Consider the following example, $k_1=9$, $k_2=12$, $m_1=7$, and $m_2=14$. Cluster examples are illustrated in FIGS. 4A, 4B, 4C, 5A, 5B, 5C, 6A, 6B and 6C. A typical value of the harmonic power ratio threshold R is R=0.6. If the HPR falls below the threshold R, then the head number is indexed by one at block 314. Otherwise, when the HPR is greater than the threshold R, the wave-front frequency $f_w$ is computed using Equation 1 as indicated in a block 312. If this frequency value $f_w$ is close to the precomputed airbearing resonance frequency $f_a$, then the likelihood of airbearing resonance is high. Thus, the findings show that the SAT defect wave-fronts are synonymous with airbearing resonance action in the slider, and the airbearing resonance action reveals a protruding defect. The estimated airbearing resonance frequency $f_a$ is then $f_a \sim f_w$.

The readback signal amplitude is inverse-exponentially related to the head-to-disk separation. If the head flies high, then the readback signal is small. The readback signal is large when the head-to-disk separation is small. The SAT site wave-fronts are most likely being set up by the vertical airbearing oscillation of the slider. At the higher fly height points the readback signal amplitude is too small to be read reliably, thus a SAT site is generated. For many laser-bumps in test bump drives described below, the recording channel lost synchronization during the bump. In the case, the SAT algorithm will default the whole sector as bad by placing a zero in column 4 and 3070 in column 6 of the P-list. However, analysis of the generalized error measurement (GEM) flyheight facility reveals airbearing resonance action across the laser bumps. Using an external synchronization method or fake sync when a loss-of-sync is detected in the P-list will again reveal the wave-front action in the binary mapping matrix M.

In accordance with features of the preferred embodiment, the method allows for the detection of airbearing resonance by simple analysis of the P-list during SAT test. Minimal computational resources are required. Disk drives that show sites of significant airbearing resonance will not be shipped, but instead reworked. This improves disk drive reliability and quality.

Figure 4C:
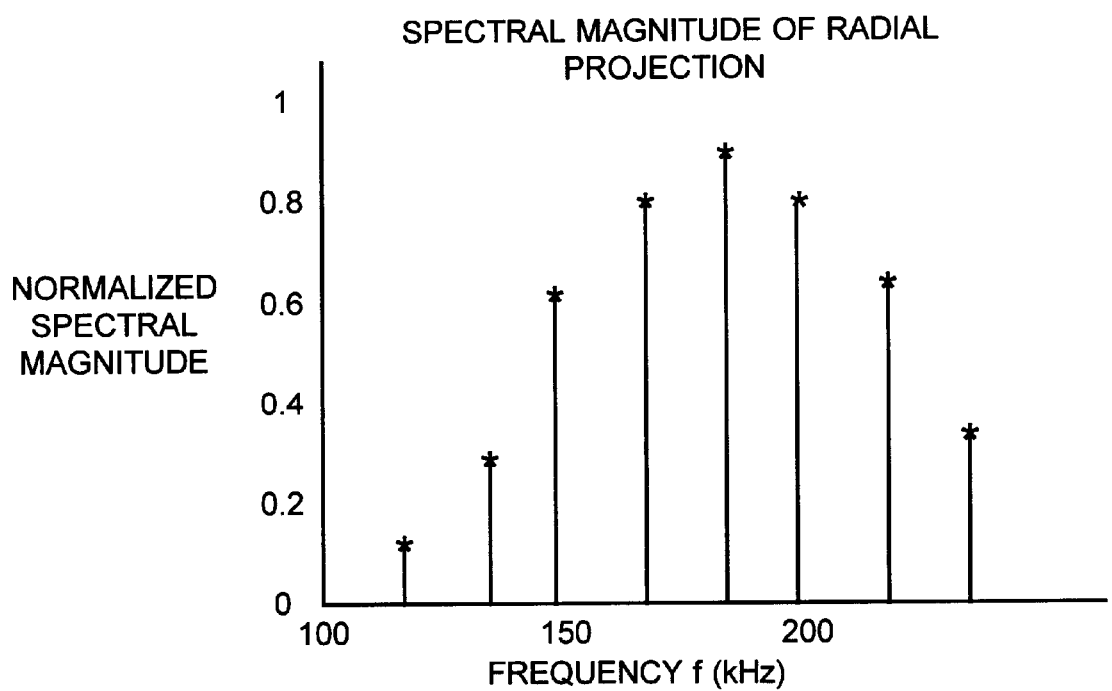
Figure 5C:
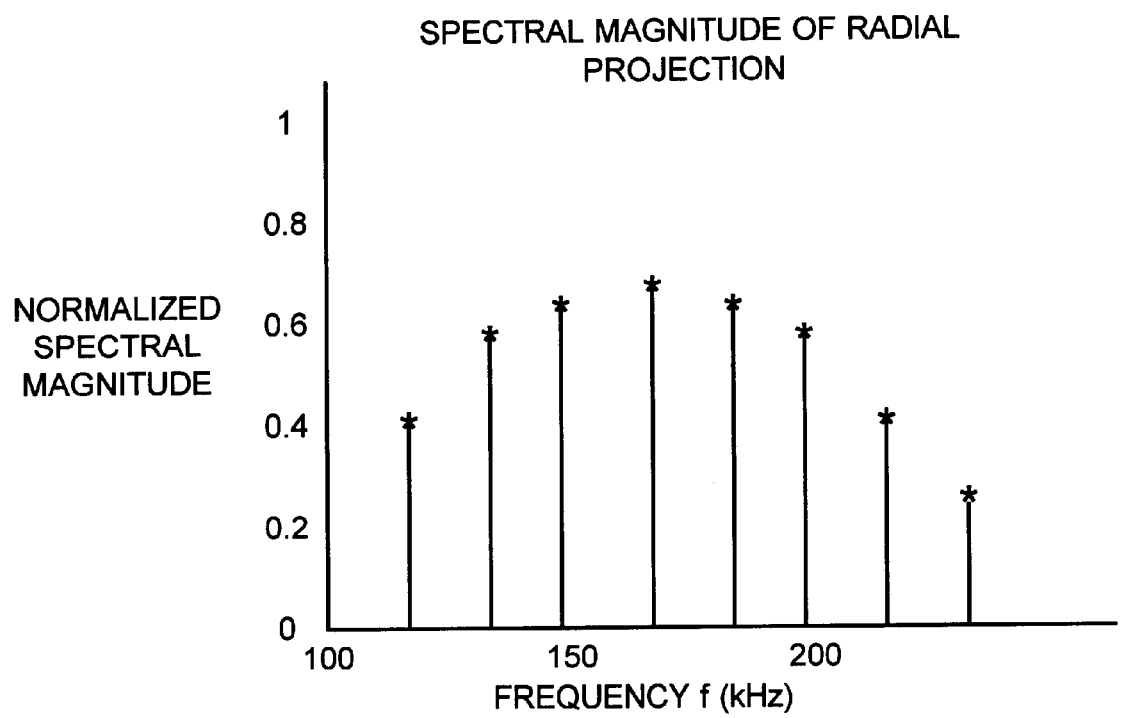
Figure 6A:
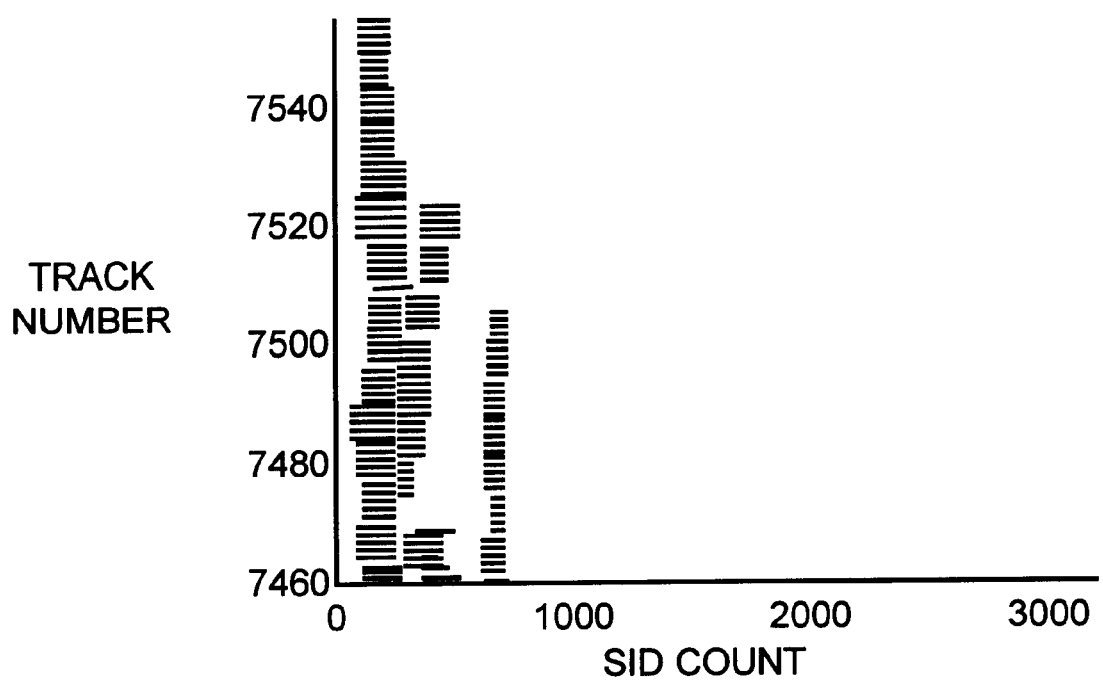
Figure 6B:
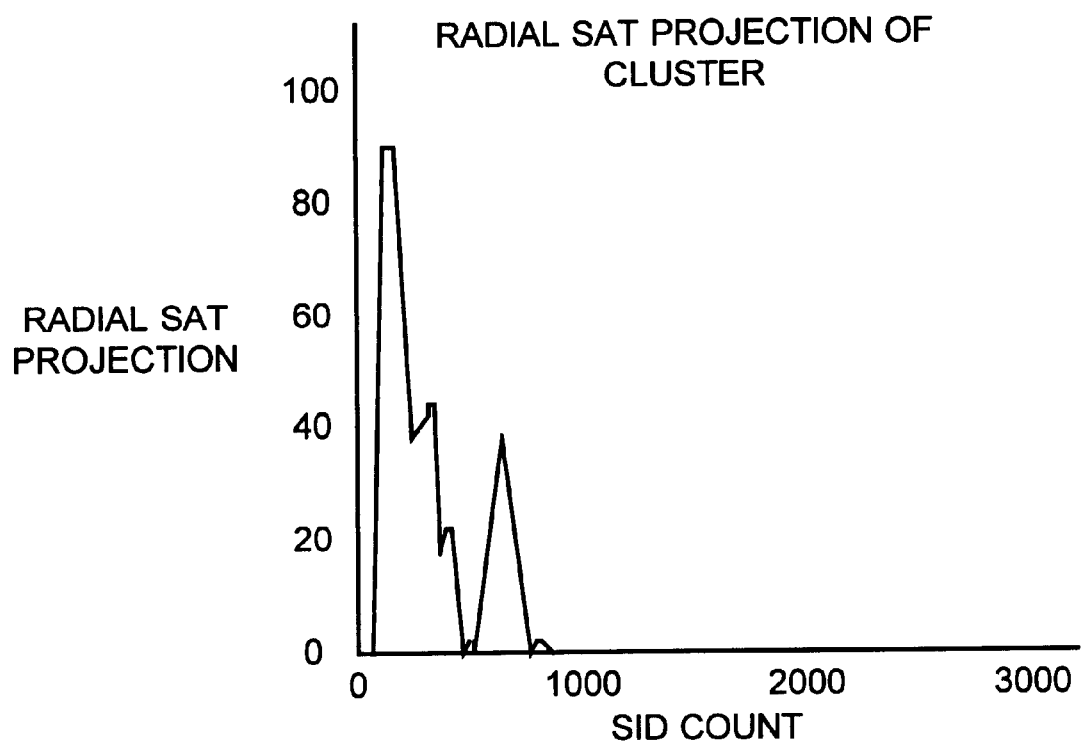
Figure 6C:
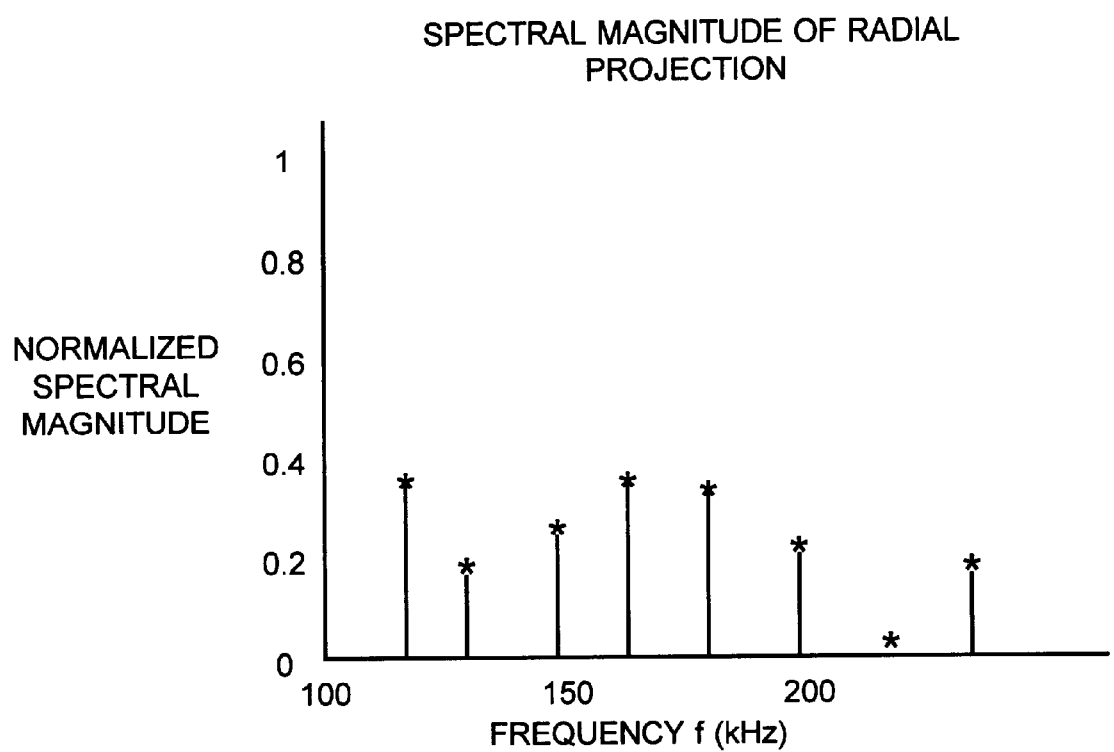

Referring to FIGS. 4A, 4B, 4C, 5A, 5B, 5C, 6A, 6B, and 6C, there are shown charts illustrating analysis of P-list data in accordance with the preferred embodiment. An analysis of P-lists from special disk drives having laser bumps along the same sector on head surface 2 and 3 has been made. In FIGS. 4A, 5A, and 6A, three multiple SAT sites from one of the special disk drives are shown. In these FIGS. 4A, 5A, and 6A, the SAT sites have been plotted on a graph of SID count versus track number. The SAT sites look like wave-fronts. FIGS. 4B, 5B, and 6B illustrate the corresponding histograms and FIGS. 4C, 5C, and 6C depict the associated harmonic magnitude content. The computed airbearing frequencies for the three projections were 175.0 kHz, 171.9 kHz, and 171.3 kHz. The airbearing resonance for the special disk drive slider is 180 kHz+/−10%. Thus, the actual findings using only the P-lists show that the SAT defect wave-fronts are synonymous with airbearing resonance action in the slider. Analysis of other surfaces that did not include the purposely made laser bumps did not reveal this wave-front phenomenon. When new SAT sites occur and are stored on the G-list, the G-list data is immediately analyzed by the algorithm of the preferred embodiment.

While the present invention has been described with reference to the details of the embodiments of the invention shown in the drawing, these details are not intended to limit the scope of the invention as claimed in the appended claims.

What is claimed is:

1. A method for detection of the presence of slider airbearing resonance using surface analysis test (SAT) primary defect list (P-list) data in a disk drive comprising the steps of:

selecting the P-list in the disk drive;

checking for a cluster threshold of adjacent tracks within a sector to identify a SAT cluster;

responsive to identifying said SAT cluster, checking for multiple defects on some tracks within said SAT cluster;

responsive to identifying said multiple defects on some tracks within said SAT cluster, converting said SAT cluster to a binary matrix map;

generating a histogram for said binary matrix map; and computing harmonic magnitude content of histogram from harmonics centered about a predetermined slider airbearing resonance frequency.

2. A method for detection of the presence of slider airbearing resonance using surface analysis test (SAT) primary defect list (P-list data as recited in claim 1 further includes the step of computing a harmonic power ratio (HPR) for said SAT cluster.

3. A method for detection of the presence of slider airbearing resonance using surface analysis test (SAT) primary defect list (P-list) data as recited in claim 2 further includes the step of comparing said computed HPR with a harmonic power ratio threshold.

4. A method for detection of the presence of slider airbearing resonance using surface analysis test (SAT) primary defect list (P-list) data as recited in claim 3 further includes the step responsive to said computed HPR being greater than said harmonic power ratio threshold, of computing a wave-front frequency of said SAT cluster.

5. A method for detection of the presence of slider airbearing resonance using surface analysis test (SAT) primary defect list (P-list) data as recited in claim 4 wherein the step of computing a wave-front frequency of said SAT cluster is represented by:

$$fw = \frac{\sum_{k=k_1}^{k_2} A(k)f(k)}{\sum_{k=k_1}^{k_2} A(k)}$$ [Equation 1]

where A(k) is the harmonic magnitude of the DFT at harmonic frequency f(k) and k is the harmonic frequency index and $k_1$ and $k_2$ are computed harmonic indices near the predetermined slider airbearing resonance frequency.

6. A method for detection of the presence of slider airbearing resonance using surface analysis test (SAT) primary defect list (P-list) data as recited in claim 3 wherein the step of computing a harmonic power ratio (HPR) for said SAT cluster is represented by:

$$HPR = \frac{\sum_{k=k_1}^{k_2} A^2(k)}{\sum_{k=m_1}^{m_2} A^2(k)} > R$$ [Equation 4]

and where R represents said harmonic power ratio threshold.

7. A method for detection of the presence of slider airbearing resonance using surface analysis test (SAT) primary defect list (P-list) data as recited in claim 1 further includes the steps responsive to not identifying said SAT cluster, of indexing a head number by one and analyzing a next surface.

8. A method for detection of the presence of slider airbearing resonance using surface analysis test (SAT) primary defect list (P-list) data as recited in claim 1 further includes the step responsive to not identifying said multiple defects on some tracks within said SAT cluster, of indexing a head number by one and analyzing a next surface.

9. A method for detection of the presence of slider airbearing resonance using surface analysis test (SAT) primary defect list (P-list) data as recited in claim 1 wherein the step of checking for a cluster threshold of adjacent tracks within a sector to identify a SAT cluster includes the step of setting said cluster threshold to 0.5*Wpad/Wtrack, where Wpad is a width of said slider pad and Wtrack is a track width.

10. A method for detection of the presence of slider airbearing resonance using surface analysis test (SAT) primary defect list (P-list) data as recited in claim 1 wherein the step responsive to identifying said multiple defects on some tracks within said SAT cluster, of converting said SAT cluster to said binary matrix map includes the step of generating said binary matrix map of dimension N×P, where N is the number of tracks in said SAT cluster and P is a maximum sector identification (SID) count.

11. A method for detection of the presence of slider airbearing resonance using surface analysis test (SAT) primary defect list (P-list) data as recited in claim 1 further includes the steps of:
selecting a grown defect list (G-list) in the disk drive:
checking for a cluster threshold of adjacent tracks within a sector to identify a SAT cluster;
responsive to identifying said SAT cluster, checking for multiple defects on some tracks within said SAT cluster;
responsive to identifying said multiple defects on some tracks within said SAT cluster, converting said SAT cluster to a binary matrix map;
generating a histogram for said binary matrix map; and
computing harmonic magnitude content of histogram from harmonics centered about a predetermined slider airbearing resonance frequency.

12. Apparatus for detection of the presence of slider airbearing resonance using surface analysis test (SAT) primary defect list (P-list) data in a disk drive comprising:
a SAT facility for generating P-list data and grown defect list (G-list) data;
a slider airbearing resonance detector for accessing said P-list data and G-list data from said SAT facility and performing the steps of:
selecting the P-list in the disk drive;
checking for a cluster threshold of adjacent tracks within a sector to identify a SAT cluster;
responsive to identifying said SAT cluster, checking for multiple defects on some tracks within said SAT cluster;
responsive to identifying said multiple defects on some tracks within said SAT cluster, converting said SAT cluster to a binary matrix map;
generating a histogram for said binary matrix map; and
computing harmonic magnitude content of histogram from harmonics centered about a predetermined slider airbearing resonance frequency.

13. Apparatus for detection of the presence of slider airbearing resonance using surface analysis test (SAT) primary defect list (P-list) data as recited in claim 12 wherein said slider airbearing resonance detector further performs the step of computing a harmonic power ratio (HPR) for said SAT cluster.

14. Apparatus for detection of the presence of slider airbearing resonance using surface analysis test (SAT) primary defect list (P-list) data as recited in claim 13 wherein said slider airbearing resonance detector further performs the step of responsive to said computed HPR being greater than said harmonic power ratio threshold, of computing a wave-front frequency of said SAT cluster.

15. Apparatus for detection of the presence of slider airbearing resonance using surface analysis test (SAT) primary defect list (P-list) data as recited in claim 14 wherein said slider airbearing resonance detector further performs the step of responsive to said computed HPR being greater than said harmonic power ratio threshold, of computing a wave-front frequency of said SAT cluster.

16. Apparatus for detection of the presence of slider airbearing resonance using surface analysis test (SAT) primary, defect list (P-list) data as recited in claim 12 wherein said slider airbearing resonance detector further performs the steps of
selecting the grown defect list (G-list) in the disk drive;
checking for a cluster threshold of adjacent tracks within a sector to identify a SAT cluster;
responsive to identifying said SAT cluster, checking for multiple defects on some tracks within said SAT cluster;
responsive to identifying said multiple defects on some tracks within said SAT cluster, converting said SAT cluster to a binary matrix map;
generating a histogram for said binary matrix map; and
computing harmonic magnitude content of histogram from harmonics centered about a predetermined slider airbearing resonance frequency.

* * * * *